United States Patent [19]

Cullen

[11] 4,346,597
[45] Aug. 31, 1982

[54] DUAL RANGE, CANTILEVERED MASS ACCELEROMETER

[75] Inventor: Donald E. Cullen, Manchester, Conn.

[73] Assignee: United Technologies Corporation, Hartford, Conn.

[21] Appl. No.: 203,822

[22] Filed: Nov. 3, 1980

[51] Int. Cl.³ .............................................. G01P 15/08
[52] U.S. Cl. .................................... 73/510; 73/517 R; 310/329
[58] Field of Search ................. 73/516 R, 517 R, 510; 310/313 R, 329, 330

[56] References Cited

U.S. PATENT DOCUMENTS

| | | | |
|---|---|---|---|
| 2,909,744 | 10/1959 | Giovanni | 73/517 R X |
| 3,940,636 | 2/1976 | Perahia | 73/517 R X |
| 4,301,683 | 11/1981 | Hartemann et al. | 73/517 R |

*Primary Examiner*—James J. Gill
*Attorney, Agent, or Firm*—M. P. Williams

[57] ABSTRACT

A dual range accelerometer includes a mass 10 supported on a cantilevered beam 12, there being stops 70, 71 such that for low accelerations the beam acts as a cantilever and for high accelerations, one of the stops causes the beam to flex as a beam supported at both ends. Surface acoustic wave devices 17, 46 provide a signal having a frequency which is a function of strain in the beam 12, thereby to detect accelerations in two different ranges.

3 Claims, 4 Drawing Figures

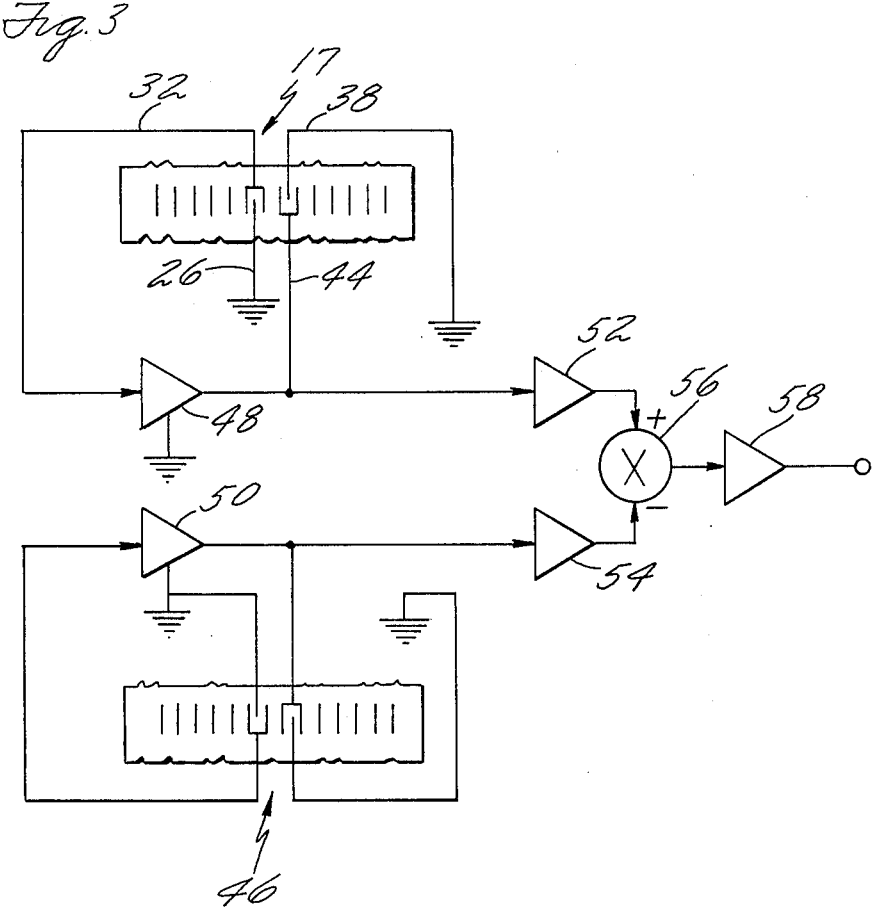

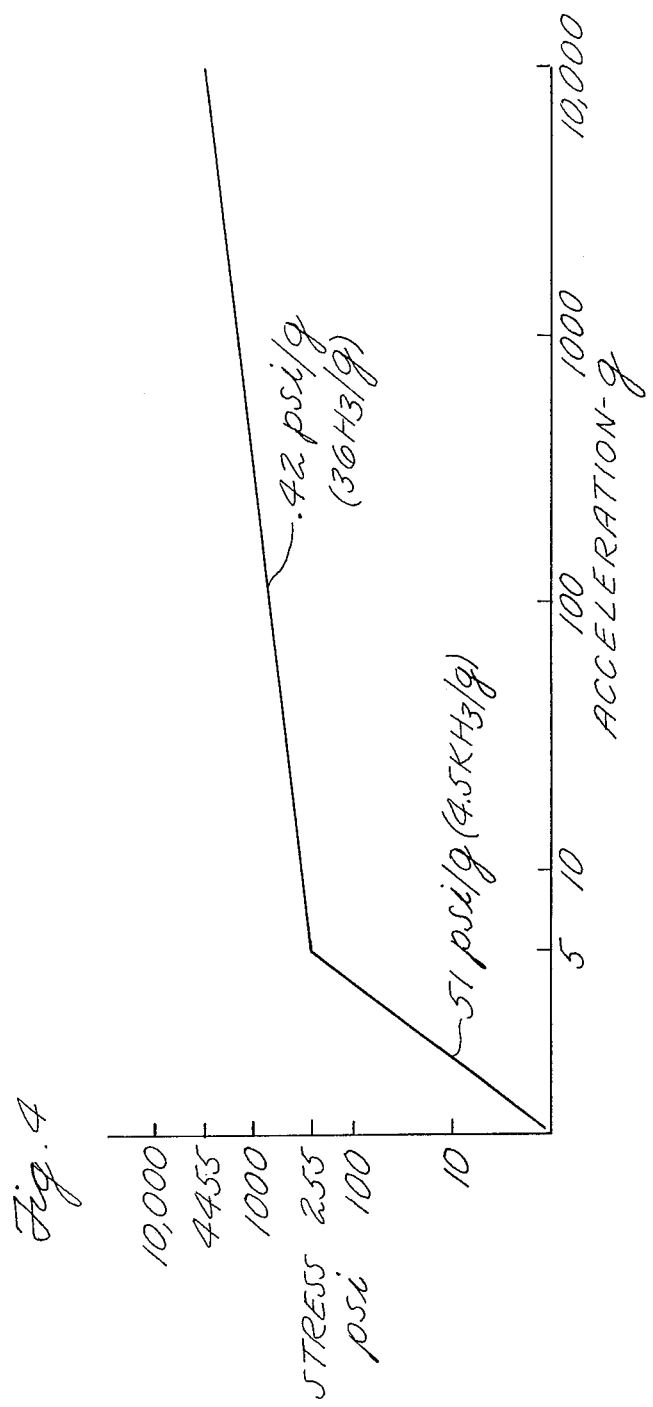

DUAL RANGE, CANTILEVERED MASS ACCELEROMETER

TECHNICAL FIELD

This invention relates to accelerometers, and more particularly to dual range, cantilevered mass accelerometers.

BACKGROUND ART

It is known to use a variety of acceleration measuring devices called accelerometers, particularly for guidance of aircraft, spacecraft, and guided weaponry. A common form of accelerometer is dynamic, employing closed loop feedback to determine accelerations in a sensitive axis. Devices of this type may typically sense accelerations on the order of ten micro g (the acceleration of gravity, 32 ft/sec$^2$), and are very expensive. In some applications, accelerations on the order of one thousand micro g are involved. This requires a different type of accelerometer. One form of accelerometer known to the prior art is a mass supported on a cantilevered beam, so that acceleration of the mass in the sensitive axis will cause a bending moment in the beam, resulting in a sensible strain. The sensing of strain in the beam has been achieved in a variety of ways. For instance, U.S. Pat. No. 3,411,361 describes the use of bonded resistor bridges disposed on the surfaces of a cavity within the beam to sense the strain therein. However, strain gages of the bonded resistor type typically have sensitivities on the order of two percent of full range, which is inadequate in many applications.

A more sensitive type of cantilevered mass accelerometer employs the variation in propagation time of a surface acoustic wave (SAW) on a piezoelectric beam, such as quartz. The strain induced by bending alters the acoustic velocity of the wave in the beam, which can be measured in a variety of ways, such as alteration of the frequency of an oscillator in which the frequency determination is principally dependent upon the acoustic velocity of the wave. Such a device is disclosed, inter alia, in U.S. Pat. No. 3,863,497. It is known that devices of this type when suitably designed are capable of sensitivities which are at least two orders of magnitude better than the sensitivities of bonded resistor strain sensors. Thus, accelerometers employing SAW devices may have sensitivities on the order of 0.001% of full range.

In some applications, it may be necessary to sense extremely high accelerations. For instance, in a crash recorder on a commercial airline, it would be useful to sense the deceleration of the aircraft during the moments preceding a crash and during the crash itself. This could provide useful information in determining the cause of the crash. Also, the impact of a meteorite on a spacecraft may typically provide accelerations way in excess of those which the normal accelerometer used for guidance can sense. At times, system weight and space constraints may preclude the use of several accelerometers in each axis in order to provide suitable ranges. However, it is difficult to provide accelerometers with a variety of ranges.

One characteristic of SAW devices which is utilized to advantage as is known in the art, is the fact that its output signal varies in frequency, rendering it easily adapted for use with digital processing circuits. Therefore, it may be desirable particularly where there are weight and space constraints, to utilize accelerometers employing surface acoustic wave effects in applications where digital computation is necessary and real time processing delay constraints preclude conversion of various analog signals to digital form.

Therefore, there is a real need in many applications for the features of an accelerometer which are achievable essentially only by the digital-compatible, highly sensitive SAW type of strain sensor.

DISCLOSURE OF INVENTION

Objects of the invention include provision of a dual range accelerometer which is sensitive, and is compatible with digital processing.

This invention is predicated in part on the discovery that the high sensitivity of a SAW accelerometer can permit sensing accelerations even with the distal end of the beam (or the mass) resting against stops.

According to the present invention, a cantilevered mass accelerometer employs stops which permit essentially unfettered flexure of the cantilever beam as a consequence of small accelerations, the stops preventing further motion of the beam which could otherwise be induced by large accelerations, whereby the accelerometer has two ranges, one in which it is constrained only at a proximal end, and the other in which it is constrained at both the proximal and distal end.

The invention may be employed using single or differential SAW or Stoneley wave devices, is easily utilized in accelerometers employing different cuts of piezoelectric material, and may be readily implemented utilizing processing techniques known in the art, in the light of the teachings which follow hereinafter.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 3 is a simplified schematic diagram of a differential oscillator configuration which may be employed with the present invention; and FIG. 4 is an exemplary illustration of the dual sensitivity of the present invention.

BEST MODE FOR CARRYING OUT THE INVENTION

Figure 1:
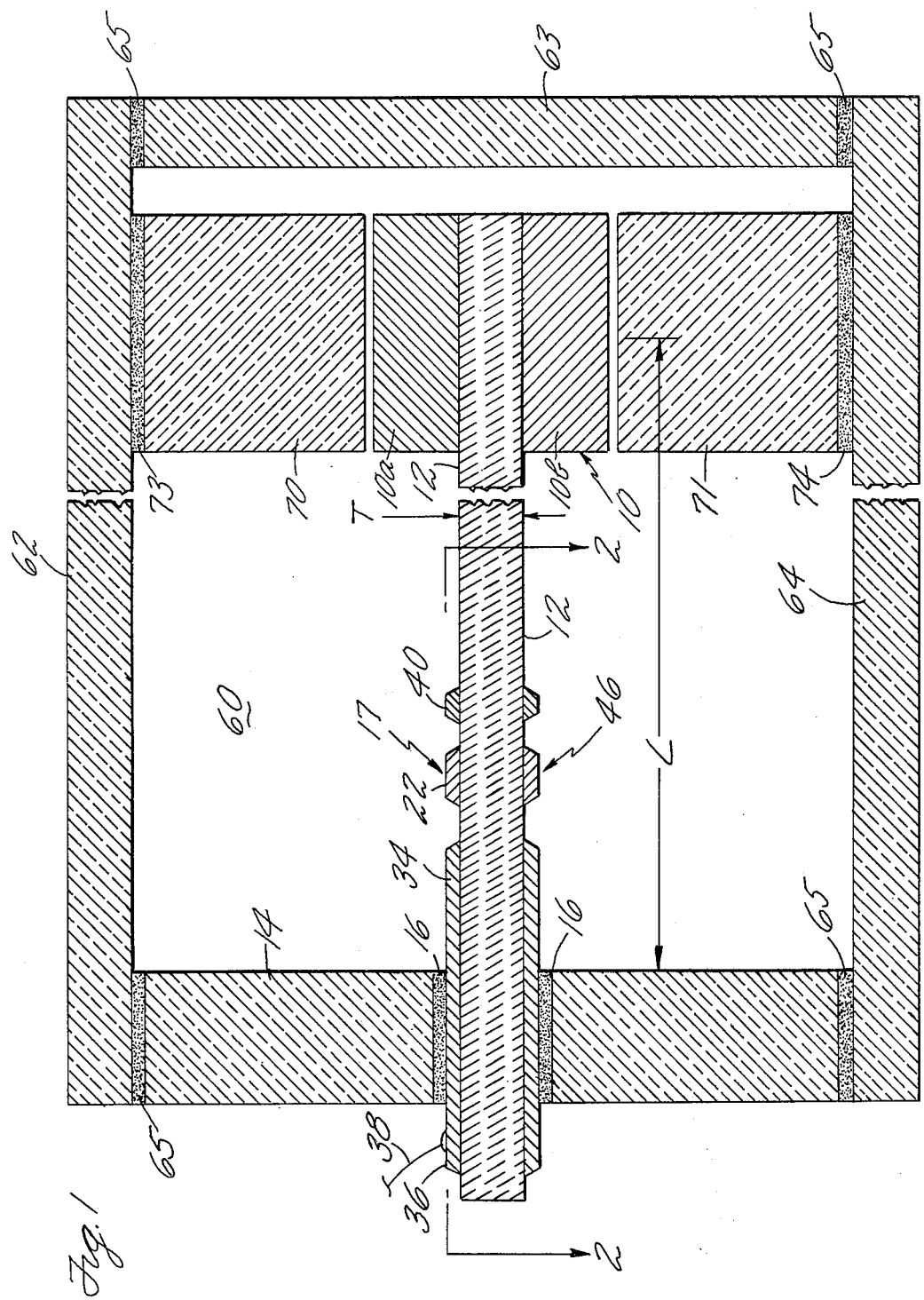
FIG. 1 is a partially broken away, sectioned side elevation view of an embodiment of the invention.
Figure 2:
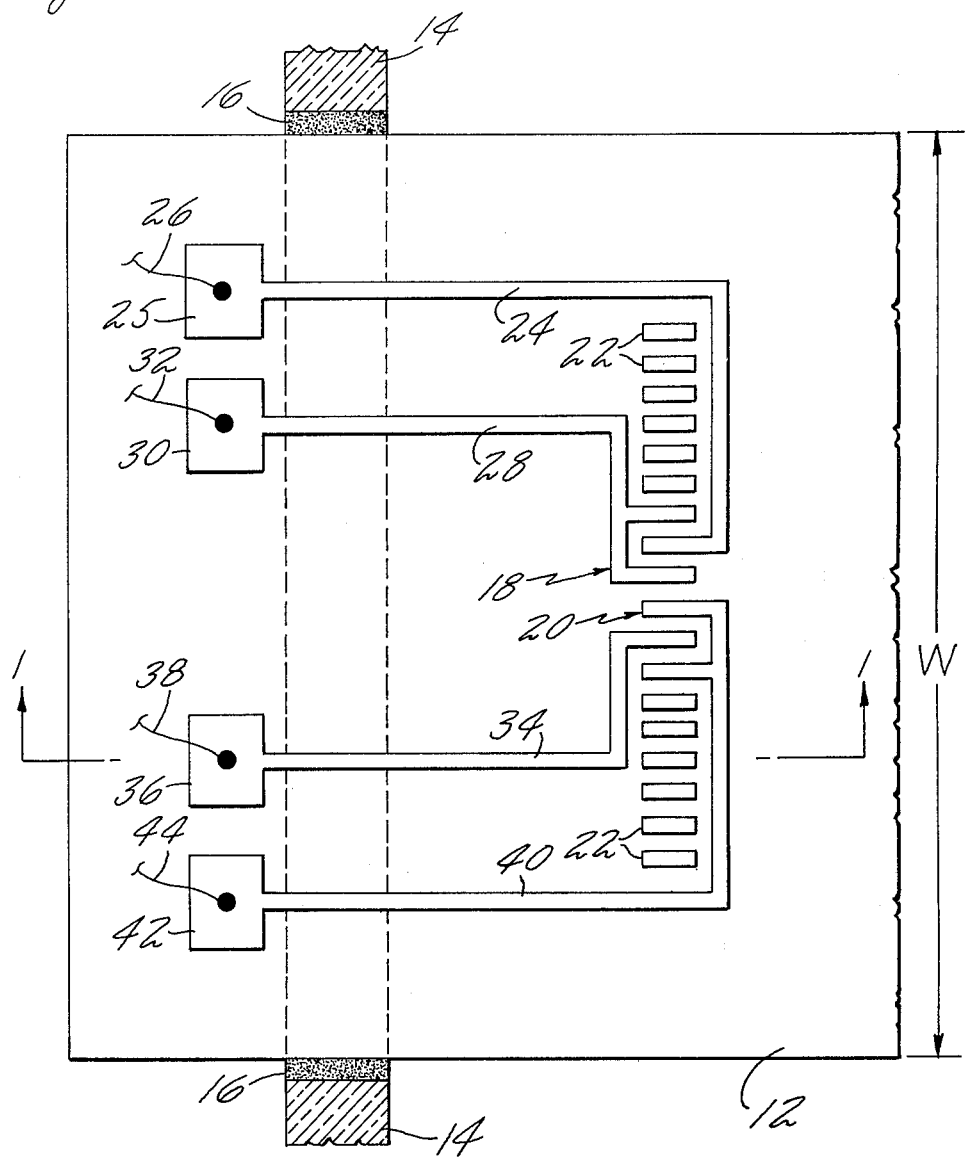
FIG. 2 is a partial, sectioned side elevation view taken on the line 2—2 in FIG. 1.

Referring now to FIGS. 1 and 2, a cantilevered accelerometer in accordance with the present invention may comprise a mass 10 disposed on a rigid elastic beam 12 which is rigidly mounted within a frame 14 so as to form a cantilever. The mass 10 may consist of suitably shaped blocks 10a, 10b of a heavy metal such as tungsten, or otherwise, as suits any implementation of the invention. The beam 12 should be a suitable piezoelectric material, such as Y-cut quartz in the exemplary embodiment therein. The blocks 10a, 10b may be bonded to the beam 12 in any suitable fashion since the portion of the beam 12 between the blocks is not subject to bending flexure. The beam 12 may be disposed in the frame 14 by means of bonding joints 16 consisting of sintered glass frit, polyimid resin, or other suitable bonding agent.

To read the acceleration-induced flexure of the beam 12, the strain in the surfaces of the beam is monitored by means of a surface acoustic wave (SAW) resonator. This may consist of a pair of interdigital electromagnetic transducers 18, 20 together with a plurality of reflector elements 22 disposed on opposite sides of the transducers 18, 20. The reflector elements 22 are typically one-quarter wavelength in width and separated by one-quarter wavelength. This configuration, as is known in the art, forms a resonator such that the minimum insertion loss of electroacoustic coupling between the transducers 18, 20 will be at the resonant frequency determined by the acoustic velocity of the medium (Y-cut quartz in the example herein) and the spacing of the reflector elements 22, the elements 18, 20, 22 being designed to suit the propagation velocity of the medium for the desired resonance wavelength, all as is known in the art. The ground side of the transducer 18 is connected by metallization 24 to a contact pad 25 to which a suitable lead 26 may be wire bonded. Similarly, the other side of the transducer 18 may be connected by metallization 28 to a pad 30 to which a lead 32 may be wire bonded. The ground side of the transducer 20 is connected by metallization 34 to a pad 36 for connection with the lead 28, and the other side of the transducer 20 is connected by metallization 40 to a pad 42 for connection to a lead 44. All of the metallization elements may be formed by deposition of a suitable thin film of metal, such as aluminum, as is known in the art.

As is known, Y-cut quartz includes a phenomenon that flexure of the beam along its longitudinal axis will alter the propagation velocity of acoustic surface waves at the surface thereof in a direction which is orthogonal to the flexure. And, the effect on the propagation velocity of the acoustic wave is of the same sense as the strain in the surface. Thus, if the mass 10 moves upwardly to bend the beam 12 in a concave fashion with respect to the SAW device 17, the velocity will increase, whereas if the beam 10 moves downwardly so that the surface of the beam where the SAW device 17 is mounted becomes convex, the velocity will decrease, causing a commensurate similar variation in the resonant frequency of an oscillator circuit which includes the SAW device.

As is illustrated in FIG. 1 and FIG. 3, since the strain effects are opposite on the opposite surfaces, it is normal to employ an additional SAW device 46 on the opposite surface of the beam 12, which is identical to the SAW device 17 described hereinbefore. This not only doubles the sensitivity (having two measurements at the same strain which are additive) but also allows cancellation of temperature effects since the temperature effects will be in the same direction in both cases, and subtraction of the two frequencies by nonlinear product mixing will produce a difference frequency in which the temperature effect has cancelled. In FIG. 3 the two SAW devices 17, 46 are each seen to be connected in series with a related amplifier 48, 50 so as to form an oscillator, the resonant frequency of which is a function of the acoustic velocity of the SAW device, and therefore of the strain in the surface on which the SAW device is disposed. The signal of the oscillators may be passed through related buffer amplifiers 52, 54 and thence to a product mixer 56 so as to provide to an amplifier 58 a frequency which is the difference between the frequency of the oscillators formed by the SAW devices 17, 46. Instead of using SAW resonators, the SAW devices 17, 46 may be SAW delay lines, connected in various configurations so as to provide the desired frequency effect. All of the foregoing is known in the art.

Referring again to FIGS. 1 and 2, the accelerometer is disposed in a chamber 60 formed by the walls of a fully enclosed structure which may be made of elements of quartz 14, 62–64 bonded together with joints 65 of sintered glass frit. Within the chamber 60, a suitable damping fluid, such as silicone oil, may be provided so as to damp the motion of the mass. If so, the SAW device 17 must be isolated therefrom in some suitable manner, such as that disclosed in commonly owned U.S. Pat. application Ser. No. 203,823, entitled FLUID DAMPED SAW ACCELEROMETER and filed on even date herewith by Gilden et al.

Referring again to FIG. 1, in accordance with the invention, a dual range cantilevered mass accelerometer, employing a SAW device, is achieved by providing a pair of stops 70, 71 to inhibit the motion of the mass 10 beyond a certain point in either direction of flexure of the beam 12. The stops 70, 71 may comprise quartz and may be bonded to the respective member 62, 64 by glass frit 73, 74. In fact, it has been found that the distance between the mass 10 and either of the stops 70, 71, when the beam is not flexed may preferably be on the order of a few or a few tens of microns, depending on geometric details, which is very difficult to achieve with ordinary manufacturing techniques. Therefore, it may be preferable to form the stops 70, 71 coat the mass blocks 10a, 10b with appropriate etchable material, such as a thin film of metal which may be aluminum or the like, and after the entire assembly as seen in FIG. 1 is made, but before side plates (parallel to the plane of FIG. 1) are installed, etching away the metal film as as to leave the thin void between the mass 10 and the respective stops 70, 71. The actual spacing involved will of course depend on all of the design parameters of the accelerometer, including the point at which the sensitivity is to change from being highly sensitive to being of a very low sensitivity, the saturation frequency of the SAW device employed, and the like.

Referring to FIG. 4, there is shown an exemplary illustration of the dual sensitivity achieved by the invention. FIG. 4 is a log-log plot since the magnitude and slopes involved could not otherwise be readily represented in such a small figure. FIG. 4 is exemplary, representing only the stress (and not the strain, acoustic velocity or frequency) of the accelerometer, since the stress is defined only by the configuration of the beam and the magnitude of acceleration, and a wide variety of other factors are involved in the other parameters.

For example, consider a quartz beam. The quartz has a density of 2.65 grams per cubic centimeter. Assuming that the accelerometer has a width W (FIG. 2) of 0.5 centimeters, a thickness T (FIG. 1) of 0.1 centimeter, and a length L (FIG. 1) of 1.5 centimeters, and assuming that the mass 10 has an equivalent mass (including the blocks 10a, 10b and the adjacent portion of the cantilever beam) has a mass M of 2 grams, the stress per acceleration (expressed in units of gravity, g) will be $6MgL/WT^2$, which works out to $3.53 \times 10^6$ dynes/cm$^2$/g, which works out to 51 psi/g. This is for operating in the low range, of 0 to 5 g, where the beam is a simple cantilever which is not impeded at its distal end.

Now consider the same accelerometer where the acceleration is sufficient to cause the mass 10 to contact one of the stops 70, 71. In this case the stress per g is expressed (the density of 2.65 hereinbefore is D) as DgL$^2$/2T which works out to 2.9×10$^4$ dyne/centimeter$^2$/g, which is equivalent to 0.42 psi/g.

Because Y-cut quartz is very linear in effect, the strain will be proportional to stress, the acoustic velocity will be proportional to strain, and therefore the frequency of the oscillator (FIG. 3) will be proportional to stress, across the entire range depicted in FIG. 4. Since Y-cut quartz has a strain sensitivity of about 3 parts per million per unit micro strain (strain×10$^{-6}$) and the elastic modulus of quartz can be taken as about 10$^7$ psi, the stress sensitivity of the example would be on the order of 3×10$^{-1}$ part per million per psi. Therefore, in the low, sensitive range of the example, the sensitivity is about 15 parts per million per g, and in the high, less sensitive range of the example, the sensitivity is about 12×10$^{-2}$ parts per million per g. If the example uses a 300 MHz oscillator (FIG. 3), this works out to having a low range sensitivity of 4.5 KHz/g and a high range sensitivity of 36 Hz per g. Therefore, the processing electronics will preferably utilize two channels sensitive within these ranges.

Although described herein in an example which utilizes Y-cut quartz, the invention may be practiced in other configurations. For instance, improved temperature stability may be achieved utilizing a surface which is 38° off the Z axis (rather than 90° to the Y axis). In such a case, however, the variation in acoustic propagation velocity as a function of strain will be sensed along the longitudinal axis (rather than transverse to it as in the example herein). Therefore, the elements of the SAW device would be mounted so that the velocity of the wave is along the longitudinal axis of the beam 12, rather than transverse to the longitudinal axis of the beam as in the Y-cut example given hereinbefore previously.

The invention is described herein as employing surface acoustic waves; however, the invention may also be practiced utilizing other, non-surface acoustic waves. For instance, the boundary between two half-spaces will support interface waves (such as Stoneley waves). And, the boundaries of a waveguide to two half-spaces will support an acoustic guided wave of the type disclosed and claimed in a commonly-owned copending U.S. patent application entitled ACOUSTIC GUIDED WAVE DEVICES, Ser. No. 203,821, filed on even date herewith by Grudkowski. The term "boundary acoustic wave" is defined herein to include such interface, guided and surface waves (to the exclusion of bulk waves). The use of non-surface boundary waves will permit use of liquid damping without the surface accommodation referred to hereinbefore.

Similarly, although the invention has been shown and described with respect to exemplary embodiments thereof, it should be understood by those skilled in the art that the foregoing and various other changes, additions and omissions may be made therein and thereto, without departing from the spirit and the scope of the invention.

I claim:

1. A dual range, cantilevered mass accelerometer comprising:

a beam comprised of piezoelectric material rigidly disposed at a proximal end so as to form a cantilever and having an inertial mass disposed at the distal end thereof, a boundary acoustic wave device formed on said beam and oriented for significant frequency sensitivity to strain in said beam, and circuit means for providing a signal indication of the boundary acoustic velocity of a wave in said boundary acoustic wave device, characterized by:

a pair of stops disposed adjacent said inertial mass and separated therefrom by a distance equivalent to deflections of said beam caused by accelerations of a magnitude defining the desired high end of the low range of said accelerometer, whereby said beam operates as a cantilever within said low range and operates as a beam supported at both ends in said high range.

2. An accelerometer according to claim 1 wherein said boundary acoustic wave device is a surface acoustic wave device.

3. An accelerometer according to claim 2 wherein said beam consists of a crystaline piezoelectric material and said surface acoustic wave device is disposed on the surface of said crystaline piezoelectric material.

* * * * *